(12) United States Patent
Gieras

(10) Patent No.: US 10,693,358 B2
(45) Date of Patent: Jun. 23, 2020

(54) RECIPROCATING ELECTROMAGNETIC ACTUATOR WITH FLUX-BALANCED ARMATURE AND STATIONARY CORES

(71) Applicant: HAMILTON SUNDSTRAND CORPORATION, Windsor Locks, CT (US)

(72) Inventor: Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 103 days.

(21) Appl. No.: 15/424,310

(22) Filed: Feb. 3, 2017

(65) Prior Publication Data

US 2018/0226868 A1 Aug. 9, 2018

(51) Int. Cl.
*H02K 33/12* (2006.01)
*H01F 7/16* (2006.01)
(Continued)

(52) U.S. Cl.
CPC .............. *H02K 33/12* (2013.01); *F01L 9/04* (2013.01); *H01F 7/081* (2013.01); *H01F 7/1638* (2013.01);
(Continued)

(58) Field of Classification Search
CPC ............. H02K 1/34; H02K 1/12; H02K 33/12
(Continued)

(56) References Cited

U.S. PATENT DOCUMENTS 4,682,574 A 7/1987 Kreuter
4,945,269 A 7/1990 Kamm
(Continued)

FOREIGN PATENT DOCUMENTS

DE 19714412 A1 10/1998
DE 19922424 A1 11/2000
(Continued)

OTHER PUBLICATIONS

Yoon, et al., "Dynamic Analysis of a Reciprocating Linear Actuator for Gass Compression Using Finite Element Method", IEEE Transactions on Magnetics, vol. 33, No. 5, Sep. 1997, pp. 4113-4115, IEEE.
(Continued)

*Primary Examiner* — Hanh N Nguyen
(74) *Attorney, Agent, or Firm* — Cantor Colburn LLP

(57) ABSTRACT

An apparatus for electromagnetic actuation includes a cylindrical housing. The apparatus further includes at least two stationary cores fixed to the cylindrical housing. Each stationary core includes at least one first annular portion having a first annular thickness between a first inner diameter and a first outer diameter. The apparatus further includes a ring coil fixed to and in operable communication with each of the at least two stationary cores. The apparatus further includes a ferromagnetic armature concentrically aligned with the at least two stationary cores and configured to move relative to the at least two stationary cores. The ferromagnetic armature has at least one second annular portion having a second annular thickness between a second inner diameter and a second outer diameter. The second annular thickness is about the same as the first annular thickness.

10 Claims, 4 Drawing Sheets

(51) Int. Cl.
   *F01L 9/04* (2006.01)
   *H01F 7/08* (2006.01)
   *H02K 1/12* (2006.01)
   *H02K 1/34* (2006.01)

(52) U.S. Cl.
   CPC ............. *H02K 1/12* (2013.01); *H02K 1/34* (2013.01); *F01L 2009/0407* (2013.01); *H01F 2007/086* (2013.01); *H01F 2007/1692* (2013.01)

(58) Field of Classification Search
   USPC .......................................... 310/30; 123/90.11
   See application file for complete search history.

(56) References Cited

U.S. PATENT DOCUMENTS

| | | | |
   |---|---|---|---|
   | 5,636,601 A * | 6/1997 | Moriya | F01L 9/04 123/90.11 |
   | 5,822,167 A | 10/1998 | Schmitz | |
   | 5,941,201 A * | 8/1999 | Shimizu | F01L 9/04 123/90.11 |
   | 6,269,784 B1 * | 8/2001 | Newton | F01L 9/04 123/90.11 |
   | 6,308,667 B1 | 10/2001 | Tsai et al. | |
   | 6,340,008 B1 | 1/2002 | Boie et al. | |
   | 6,390,036 B1 | 5/2002 | Yuuki | |
   | 6,549,390 B1 | 4/2003 | Ozawa et al. | |
   | 6,737,946 B2 | 5/2004 | Seale et al. | |
   | 8,070,463 B2 | 12/2011 | Stephens et al. | |
   | 8,390,160 B2 | 3/2013 | Gieras et al. | |
   | 8,461,732 B2 | 6/2013 | Gieras et al. | |
   | 2015/0098849 A1 | 4/2015 | Bagagli et al. | |

FOREIGN PATENT DOCUMENTS

| | | |
   |---|---|---|
   | EP | 1450009 A2 | 8/2004 |
   | EP | 2367180 A2 | 9/2011 |
   | GB | 2302762 A | 1/1997 |

OTHER PUBLICATIONS

Zupan, et al., "Actuator Classification and Selection—The Development of a Database**", Advanced Engineering Materials 2002, vol. 4, No. 12, 2002, pp. 933-939, 2002 Wiley-VCH Verlag GmbH & Co. KGaA, Weinheim.
   European Search Report for Application No. 18154671.4-1212; dated Jun. 29, 2018; 9 pgs.

* cited by examiner

RECIPROCATING ELECTROMAGNETIC ACTUATOR WITH FLUX-BALANCED ARMATURE AND STATIONARY CORES

BACKGROUND

Exemplary embodiments pertain to the art of electromagnetic actuators, and more particularly, to reciprocating electromagnetic actuators with a flux-balanced armature and stationary cores.

Electromagnetic linear actuators convert electrical energy into mechanical energy expressed as translatory motion. Electromagnetic actuators can be classified as electric motor driven actuators, solenoid actuators, and moving coil actuators. Reciprocating motion is a repetitive up-and-down or back-and-forth linear motion. Electromagnetic linear actuators are found in a wide range of mechanisms including reciprocating valves, engines and pumps. Reciprocating linear actuators that reciprocate an armature with permanent magnets (PMs) may not maximize force density (force per mass or per volume). PM actuators can be cost prohibitive for some applications and can experience higher rates of malfunction. For example, the operating temperature of PM devices may be limited and can be dependent on the grade of the PM material. Furthermore, PM devices can become demagnetized with time due to repetitive impact stationary armature-stationary core.

In other aspects, the armature shape may also provide limitations. For example, armatures of some actuators with a uniform or flat surface may not provide adequate magnetic flux control that provide actuation forces needed for some applications.

BRIEF DESCRIPTION

In one embodiment, an apparatus for electromagnetic actuation includes a cylindrical housing. The apparatus further includes at least two stationary cores fixed to the cylindrical housing. Each stationary core includes at least one first annular portion having a first annular thickness between a first inner diameter and a first outer diameter. The apparatus further includes a ring coil fixed to and in operable communication with each of the at least two stationary cores. The apparatus further includes a ferromagnetic armature concentrically aligned with the at least two stationary cores and configured to move relative to the at least two stationary cores. The ferromagnetic armature has at least one second annular portion having a second annular thickness between a second inner diameter and a second outer diameter. The second annular thickness is about the same as the first annular thickness.

In another embodiment, an apparatus for electromagnetic actuation includes a cylindrical housing. The apparatus further includes at least two stationary cores fixed to the cylindrical housing. Each stationary core includes at least one first annular portion having a first annular thickness between a first inner diameter and a first outer diameter. The apparatus further includes a ring coil fixed to and in operable communication with each of the at least two stationary cores. The ring coil includes a pair of stationary windings and having an inner diameter and an outer diameter. The apparatus further includes a ferromagnetic armature concentrically aligned with the at least two stationary cores and configured to move relative to the at least two stationary cores. The ferromagnetic armature has at least one second annular portion having a second annular thickness between a second inner diameter and a second outer diameter. The second annular thickness is about the same as the first annular thickness.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Figure 1:
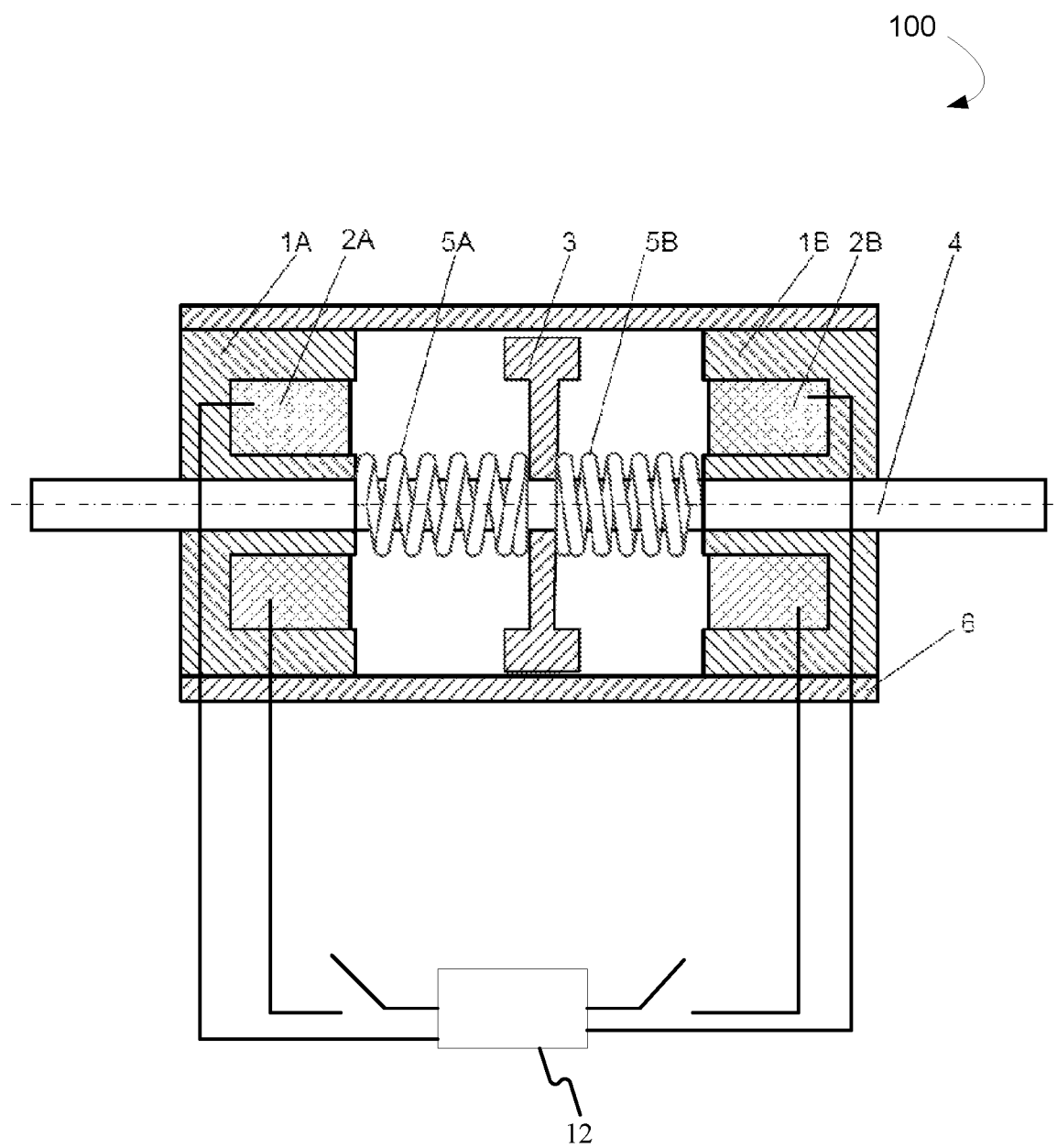
FIG. 1 depicts a cross-sectional view of an electromagnetic actuator, according to one embodiment.

FIG. 1 depicts a cross-sectional view of an electromagnetic actuator 100 (hereafter "actuator 100"). Actuator 100 includes a pair of stationary cores 1A and 1B, a pair of ring coils 2A and 2B, a ferromagnetic armature 3, a rod 4, a pair of biasing members (e.g., return springs 5A and 5B), a cylindrical housing 6, and a power source 12 configured to switch power to ring coils 2A and 2B (alternately), and power stationary cores 1A and 1B simultaneously.

Stationary cores 1A and 1B are electromagnets that can be configured on an opposite end of cylindrical housing 6 such that their poles face the center of the device toward ferromagnetic armature 3. Accordingly, stationary cores 1A and 1B are constructed of ferromagnetic material such as steel or soft magnetic composite material (SMC). Although two stationary cores 1A and 1B are shown, it is appreciated that actuator 100 may include any number of cores configured similarly as stationary cores 1A and 1B.

Cylindrical housing 6 is configured to surround stationary cores 1A and 1B, and may be constructed of ferromagnetic material such as steel, or non-ferromagnetic material (e.g., aluminum).

Rod 4 is rigidly fixed to ferromagnetic armature 3. Rod 4 may be constructed of a ferromagnetic material. In some embodiments, rod 4 is constructed of brass or another non-ferromagnetic material to prevent wear and reduce mechanical friction of the core-rod.

Ring coils 2A and 2B are ring shaped coils operatively connectable to a power source 12 and configured to be independently energized by the power source 12. Ring coils 2A and 2B are constructed of current-conducting wires such as copper or aluminum. Coils 2A and 2B can be also wound using copper or aluminum ribbon. Ring coil 2A is rigidly fixed to stationary core 1A in a pocket having the same shape as ring coil 2A. Coil 2B is rigidly fixed to stationary core 1B in a pocket having the same shape as the ring coil 2B.

Figure 2:
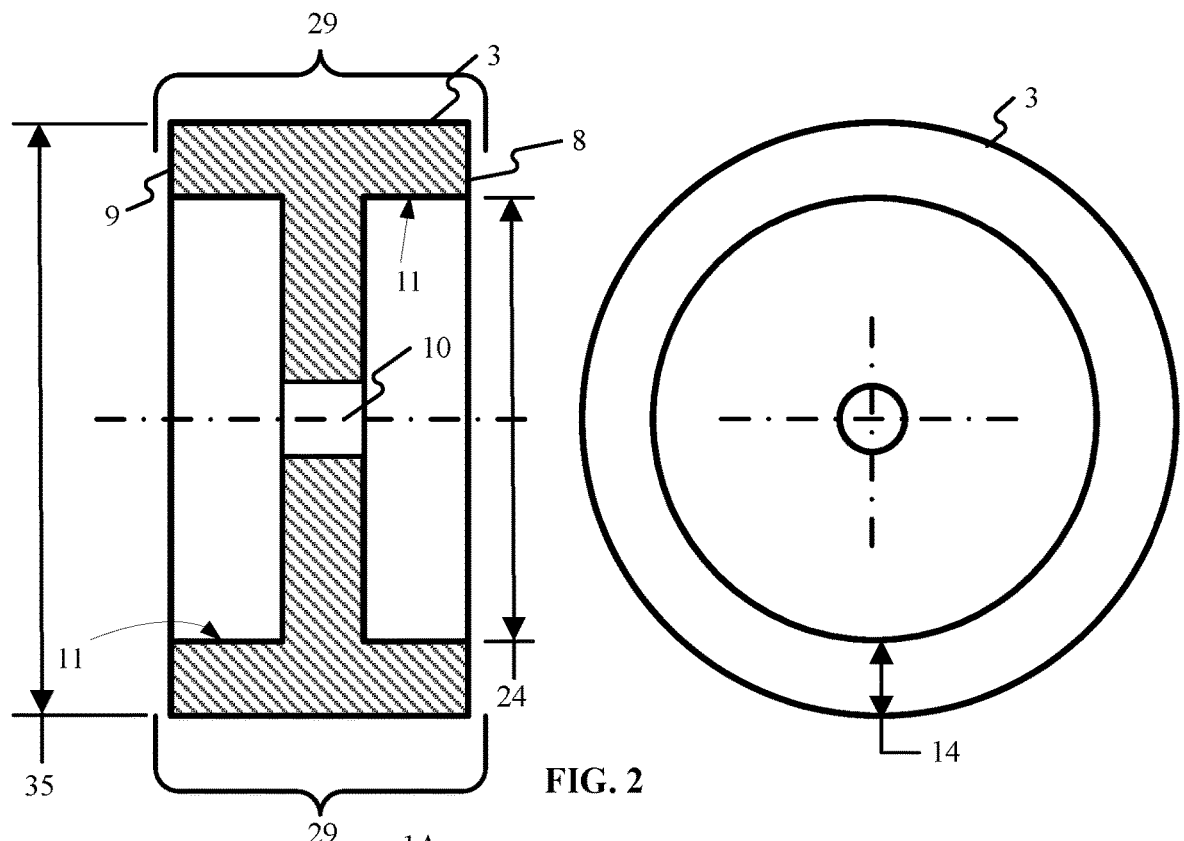
FIG. 2 depicts a section view and top view of a ferromagnetic armature, according to one embodiment.

Actuator 100 includes a ferromagnetic armature 3 configured between stationary cores 1A and 1B. FIG. 2 depicts a section view and top view of ferromagnetic armature 3. Referring briefly to FIG. 2, ferromagnetic armature 3 is concentrically fixed to rod 4 (omitted in FIG. 3 for clarity) at center point 10, and configured to reciprocate in an interior of the cylindrical housing 6 between ring coils 2A and 2B.

Returning again to FIG. 1, Return springs 5A and 5B are configured to bias ferromagnetic armature 3 away from stationary cores 1A and 1B. In some aspects, ferromagnetic armature 3 is configured to move back and forth axially in a reciprocal motion, counter to the force of return springs 5A and 5B. Reciprocation, as explained hereafter, occurs in response to introduction of a power source (not shown) operatively connected to stationary cores 1A and 1B which function as electromagnets. When stationary cores 1A and 1B are energized one after another, they produce the electromagnetic forces to move ferromagnetic armature 3 back and forth, which actuates rod 6. In some aspects, the shape of ferromagnetic armature 3 maximizes the magnetic flux and consequently maximize the attraction force between the armature and ferromagnetic cores 1A and 1B.

Referring again to FIG. 2, ferromagnetic armature 3 includes an outside diameter 35. Ferromagnetic armature 3 includes a first face 8 opposing a second face 9. Faces 8 and 9 of ferromagnetic armature 3 each include a cylindrical recess that forms an interior recess wall 11. According to one embodiment, the cylindrical recess (i.e., cup) may have an axial depth selected to control a particular amount of magnetic flux permitted to interact with armature 3. The interior recess wall 11 and the outer diameter 35 of ferromagnetic armature 3 form a cylindrical wall having a dimension (or thickness) (dimension 14) that generally matches a thickness of a matching annular portion on the stationary cores. Ferromagnetic armature 3 is concentrically aligned with the at least two stationary cores 1A and 1B. In some aspects, ferromagnetic armature 3 is configured to move relative to stationary cores 1A and 1B. Ferromagnetic armature 3 includes at least one annular portion 29 having an annular thickness 14 between an inner diameter 24 and an outer diameter 35. In some aspects, the annular thickness 14 being about the same as the annular thickness 15 described hereafter with respect to FIG. 3.

Figure 3:
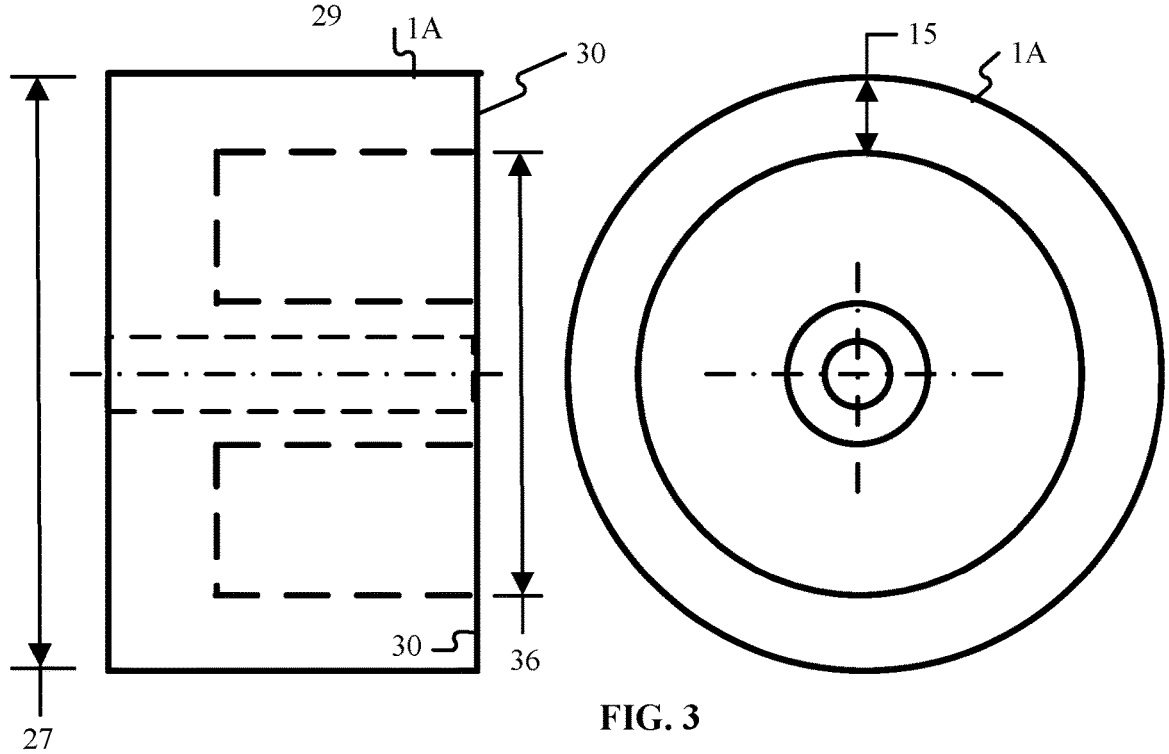
FIG. 3 depicts a stationary core according to one embodiment.

FIG. 3 depicts a stationary core 1A. According to one embodiment, actuator 100 includes at least two stationary cores (e.g., stationary core 1A) fixed to the cylindrical housing 6. In some aspects, each stationary core 1A includes at least one annular portion having an annular thickness 15 between an inner diameter 36 and a outer diameter 27. Thickness 15 is configured to be annularly aligned with dimension 14 of ferromagnetic armature 3. Stated in other terms, dimensions 14 (as shown in FIG. 2) may be substantially similar to or identical to dimension 15 (as shown in FIG. 3) within a predetermined tolerance of difference, and dimension 24 may be substantially similar to or identical to dimension 26, within a predetermined tolerance of difference. Thickness 15 may be smaller or greater than thickness 14 dependent on what shape of the force versus gap (displacement) characteristic is required. A predetermined tolerance may be 1%, for example. In another embodiment, the predetermined tolerance may be 2%, or 5%, or 10% difference between dimensions.

Accordingly, the inside diameters forming the cups and the outside diameter of armature 3 and stationary cores 1A and 1B share similar dimensions so as to align faces 8 and 9 with the corresponding features on stationary cores 1A and 1B. For example, in some aspects, first face 8 and second face 9 of armature 3 may correspond to portions of stationary cores 1A and 1B such that dimensions 14 and 15 are aligned when assembled within the predetermined tolerance. In this way the magnetic flux lines are concentrated in the air gap between the stationary part and moving armature. If the armature is flat (e.g., without cup recesses) some of the magnetic flux may freely penetrate a surface of the moving armature located radially inwardly of the portion 30 of the stationary cores 1A and 1B.

Stationary cores 1A and 1B are geometrically similar within the predetermined tolerance of difference. By keeping thickness 14 equal to distance 15, magnetic flux is configured to provide a high force density (force per mass or per volume) as compared to a ferromagnetic armature having flat faces 8 and 9 without twin cups. It should be appreciated that dimension 25 may be smaller than dimension 27 by a marginal amount to allow a slip fit or clearance between the inside diameter of housing 6 and dimension 25 (the outside diameter) of armature 3.

Figure 4:
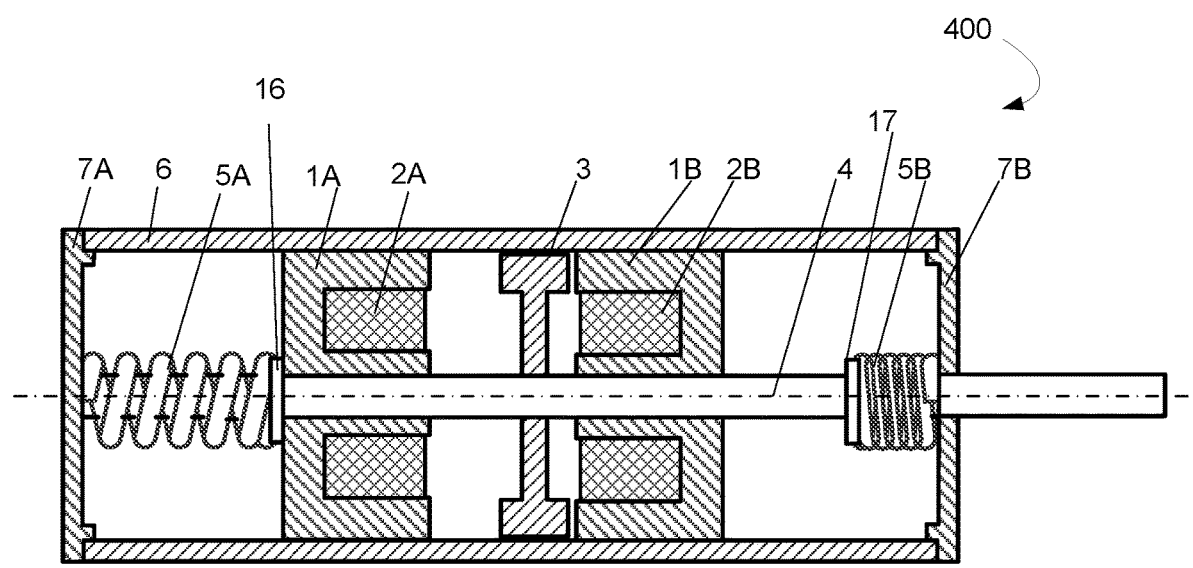
FIG. 4 depicts an actuator having return springs and 5B positioned against a bottom wall of the spring covers according to one embodiment.

In some aspects, magnetic flux is maximized when the space between ferromagnetic armature 3 and the energized ring coil is small. Accordingly, it may be advantageous to configure the actuator with biasing members such as springs outside of the interior of cylindrical housing 6. FIG. 4 depicts an actuator 400 having return springs 5A and 5B positioned against a bottom wall of spring covers 7A and 7B, between a flanges 16 and 17, which are rigidly configured on each end of rod 4. Spring covers 7A and 7B are rigidly fixed to cylindrical housing 6.

Figure 5:
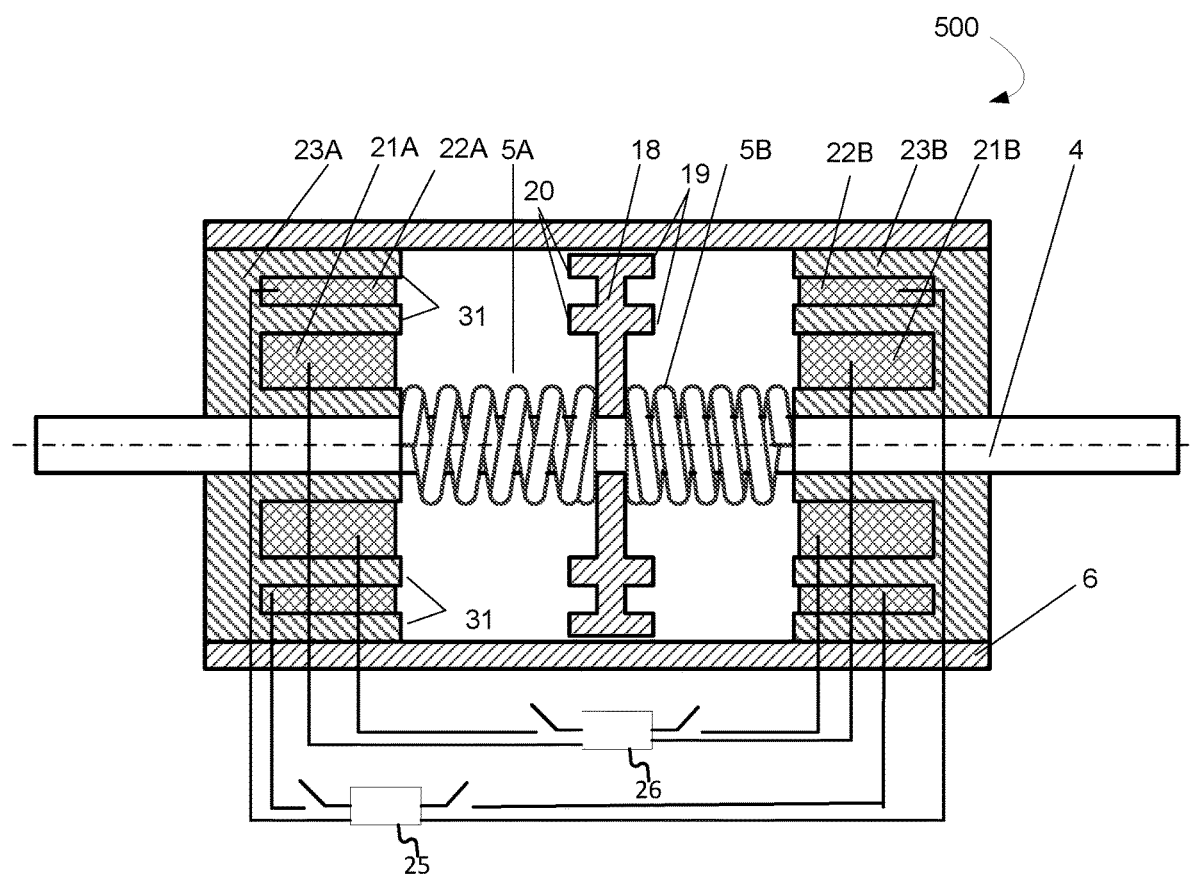
FIG. 5 depicts an actuator having an armature according to one embodiment.

FIG. 5 depicts an actuator 500 having an armature 18 with two steps 19 and 20, and two stationary cores 23A and 23B, respectively, each having two annular portions 31 respectively matching steps 19 and 20, according to one embodiment. Actuator 500 may include two coils per core: 21A and 22A for stationary core 23A, and two coils 21B and 22B for stationary core 23B. In some aspects, armature 18 has two annular portions 19 and 20, which maximize magnetic flux in configurations having two magnetic cores (e.g., 21A and 22A) at each end of the actuator. The configuration of armature 18 is geometrically similar with respect to the corresponding portions of stationary cores 23A and 23B as described with respect to FIGS. 2 and 3 where dimension 24 matches dimension 26, and dimension 25 matches dimension 27, except that there are two annular portions (shown collectively as annular portion 19) at one face of armature 18, and two annular portions (shown collectively as annular portion 20) corresponding with the matching features of the annular portions on stationary cores 23A. Stationary core 23B may be substantially similar to stationary core 23A, and have annular portions facing annular portion 19 of armature 18.

According to one embodiment, the benefits for the configuration of actuator 500 are at least twofold: First, having two coils in each magnetic core provides precise control of magnetic flux, and consequently, precise control of the attraction force that actuates rod 4. Second, the magnitude of magnetic flux may be controlled precisely by controlling the direction of each of the respective power sources operatively connected to the coils. For example, according to one embodiment, the two coils 21A and 22A, and 21B and 22B, respectively can be fed form separate power sources 25 and 26. Each of power sources 25 and 26 can be independently controllable. Inner cylindrical coils 21A and 21B can be connected in series or in parallel. Similarly, outer coils 22A and 22B can be connected in series or in parallel. In FIG. 5 the power source 26 energizes the inner coils 21A and 21B. The power source 25 energizes the outer coils 22A and 22B. Other connection of coils, i.e., outer coil 22A in series with inner coil 21B and inner coil 21A in series with outer coil 22B are also possible. In some aspects, the currents of power sources 25-28 may be independently reversible. Accordingly, the currents in each coil per core can be different, and the direction of currents in each coil per core can be the same or opposite. The control of the direction of each coil is changeable based on a desired actuation force at rod 4. By controlling the currents at each core, the attraction force can be reduced, magnified, or boosted by feeding both coils at a particular side of actuator 700 (e.g., 21A and 22A) per core, with current flowing in the same direction or in opposing directions.

Embodiments of the present disclosure may improve actuation forces for compressors, pumps, engines, fuel valves, positioning systems, turbochargers, and other applications.

What is claimed is:

1. An apparatus for electromagnetic actuation comprising:
a cylindrical housing;
at least two stationary cores fixed to the cylindrical housing, each stationary core having at least one first annular portion and a second annular portion surrounding the first annular portion;
first, second, third and fourth ring coils, wherein the first and second ring coils are located within the a first of the at least two stationary cores and the third and fourth ring coils are located within a second of the at least two stationary cores; and
a ferromagnetic armature, the ferromagnetic armature concentrically aligned with the at least two stationary cores and configured to move relative to the at least two stationary cores, the ferromagnetic armature having at least two steps extending from each side thereof, a first of the two steps aligns with the first annular portion a one of at least two stationary cores and a second annular step aligns with the second annular portion on the one of the at least stationary cores.

2. The apparatus of claim 1, the ring coils operatively connectable to one of two power sources.

3. The apparatus of claim 2, wherein each of the at least two stationary cores are configured with poles facing the ferromagnetic armature.

4. The apparatus of claim 1, wherein each of the at least two stationary cores is a cylindrical electromagnet having axial-symmetry.

5. The apparatus of claim 1, further comprising at least one biasing member configured to bias the ferromagnetic armature away from at least one of the at least two stationary cores.

6. The apparatus of claim 5, wherein the at least one biasing member is a return spring is configured between a face of the ferromagnetic armature and the ring coil.

7. The apparatus of claim 1, further comprising a pair of spring covers each concentrically fixed at a distal end of the cylindrical housing.

8. The apparatus of claim 7, further comprising at least one biasing member, wherein the at least one biasing member is configured between a face of the ferromagnetic armature and a face of the ring coil.

9. The apparatus of claim 1, further comprising a rod concentric with the cylindrical housing and the at least two stationary cores, and configured to slide axially through the cylindrical housing.

10. The apparatus of claim 1, wherein the first outer diameter of the at least one stationary core is about the same as the second outer diameter of the ferromagnetic core.

* * * * *